United States Patent
Osborn et al.

(10) Patent No.: US 9,315,402 B2
(45) Date of Patent: Apr. 19, 2016

(54) SYSTEMS AND METHODS FOR WASTEWATER TREATMENT

(75) Inventors: Gregory Scott Osborn, Fayetteville, AR (US); Clay R. Thompson, Fayetteville, AR (US); Marty D. Matlock, Fayetteville, AR (US)

(73) Assignees: Board of Trustees of the University of Arkansas, Little Rock, AR (US); BlueInGreen, LLC, Fayetteville, AR (US)

( * ) Notice: Subject to any disclaimer, the term of this patent is extended or adjusted under 35 U.S.C. 154(b) by 889 days.

(21) Appl. No.: 13/415,539

(22) Filed: Mar. 8, 2012

(65) Prior Publication Data
US 2012/0325741 A1   Dec. 27, 2012

Related U.S. Application Data

(63) Continuation-in-part of application No. 11/921,057, filed on Nov. 7, 2008, now Pat. No. 8,276,888.

(60) Provisional application No. 61/450,419, filed on Mar. 8, 2011.

(51) Int. Cl.
*B01F 3/04* (2006.01)
*C02F 3/12* (2006.01)
(Continued)

(52) U.S. Cl.
CPC .............. *C02F 3/1268* (2013.01); *C02F 1/444* (2013.01); *C02F 1/78* (2013.01); *C02F 3/24* (2013.01);
(Continued)

(58) Field of Classification Search
CPC .......... C02F 1/444; C02F 1/78; C02F 3/1268; C02F 3/1273; C02F 3/26; C02F 3/301; C02F 3/302; C02F 2209/22; C02F 2209/42; C02F 3/24; Y02W 10/15

USPC .................. 261/26, 28, 37, 76, 77, 78.2, 115, 261/119.1, 122.1, 124; 239/11; 210/620, 210/631, 638, 760, 97, 151, 192, 205, 221.2
See application file for complete search history.

(56) References Cited

U.S. PATENT DOCUMENTS

| | | | |
|---|---|---|---|
| 3,643,403 A | | 2/1972 | Speece |
| 3,772,187 A | * | 11/1973 | Othmer .......................... 210/622 |

(Continued)

FOREIGN PATENT DOCUMENTS

| | | |
|---|---|---|
| DE | 35 01 175 A1 | 7/1986 |
| JP | 08132094 | 5/1996 |

(Continued)

OTHER PUBLICATIONS

Extended European Search Report; European Patent Office; European Patent Application No. 06771268.7 (Oct. 23, 2012).

(Continued)

*Primary Examiner* — Charles Bushey
(74) *Attorney, Agent, or Firm* — Richard Blakely Glasgow

(57) ABSTRACT

Disclosed is a system and method for treating wastewater. The system includes a bioreactor which defines a basin for receiving wastewater to be treated; a membrane module in fluid communication with the bioreactor; and a dissolution tank. The tank includes a pressure vessel that contains a portion of the wastewater to be treated and provides a regulated, pressurized gas head space above the wastewater. The tank also includes at least one liquid spray nozzle that permits passage of the wastewater into the gas head space of the pressure vessel and an outlet for discharging the wastewater having a desired gas concentration from the pressure vessel. The system also includes a pumping mechanism for supplying the wastewater to the spray nozzle of the tank such that fluid droplets are formed in the gas head space and the gas contained within the pressurized head space is dissolved into the wastewater.

18 Claims, 6 Drawing Sheets

(51) Int. Cl.

| | |
|---|---|
| C02F 1/44 | (2006.01) |
| C02F 1/78 | (2006.01) |
| C02F 3/26 | (2006.01) |
| C02F 3/30 | (2006.01) |
| C02F 3/24 | (2006.01) |

(52) U.S. Cl.
CPC . *C02F 3/26* (2013.01); *C02F 3/301* (2013.01); *C02F 3/302* (2013.01); *C02F 2209/22* (2013.01); *C02F 2209/42* (2013.01); *Y02W 10/15* (2015.05)

(56) References Cited

U.S. PATENT DOCUMENTS

| | | | |
|---|---|---|---|
| 3,856,671 A | 12/1974 | Lee et al. | |
| 3,932,282 A | 1/1976 | Ettelt | |
| 3,960,066 A | 6/1976 | LaRocco et al. | |
| 4,086,152 A | 4/1978 | Rich et al. | |
| 4,132,637 A | 1/1979 | Key et al. | |
| 4,163,712 A | 8/1979 | Smith | |
| 4,256,574 A | 3/1981 | Bhargava | |
| 4,317,731 A | 3/1982 | Roberts, Jr. et al. | |
| 4,461,426 A | 7/1984 | Christopher | |
| 4,501,664 A | 2/1985 | Heil et al. | |
| 4,652,382 A | 3/1987 | Edwards | |
| 4,735,750 A | 4/1988 | Damann | |
| 4,863,643 A | 9/1989 | Cochran | |
| 4,981,582 A | 1/1991 | Yoon et al. | |
| 5,275,742 A | 1/1994 | Satchell, Jr. et al. | |
| 5,376,265 A | 12/1994 | Szabo | |
| 5,382,358 A | 1/1995 | Yeh | |
| 5,451,349 A | 9/1995 | Kingsley | |
| 5,487,835 A | 1/1996 | Shane | |
| 5,514,264 A | 5/1996 | Shane | |
| 5,569,180 A | 10/1996 | Spears | |
| 5,637,231 A | 6/1997 | Hill et al. | |
| 5,647,977 A | 7/1997 | Arnaud | |
| 5,674,312 A | 10/1997 | Mazzei | |
| 5,735,934 A | 4/1998 | Spears | |
| 5,766,484 A | 6/1998 | Petit et al. | |
| 5,865,995 A | 2/1999 | Nelson | |
| 5,885,467 A | 3/1999 | Zelenak et al. | |
| 5,904,851 A | 5/1999 | Taylor et al. | |
| 5,911,870 A | 6/1999 | Hough | |
| 5,951,921 A | 9/1999 | Koganezawa et al. | |
| 5,968,421 A | 10/1999 | Schattney et al. | |
| 5,979,363 A | 11/1999 | Shaar | |
| 6,076,808 A | 6/2000 | Porter | |
| 6,090,294 A | 7/2000 | Teran et al. | |
| 6,153,111 A | 11/2000 | Conrad et al. | |
| 6,193,893 B1 | 2/2001 | Mazzei et al. | |
| 6,279,882 B1 | 8/2001 | Littman et al. | |
| 6,280,633 B1 | 8/2001 | Conrad et al. | |
| 6,284,138 B1 | 9/2001 | Mast | |
| 6,315,893 B1 | 11/2001 | Sawada | |
| 6,344,489 B1 | 2/2002 | Spears | |
| 6,372,131 B1 | 4/2002 | Mirowsky | |
| 6,474,627 B2 | 11/2002 | Speece | |
| 6,485,003 B2 | 11/2002 | Speece | |
| 6,488,271 B1 | 12/2002 | Nelson | |
| 6,503,403 B2 | 1/2003 | Green et al. | |
| 6,530,895 B1 | 3/2003 | Keirn | |
| 6,555,059 B1 | 4/2003 | Myrick et al. | |
| 6,565,807 B1 | 5/2003 | Patterson et al. | |
| 6,568,661 B1 | 5/2003 | Shane | |
| 6,637,731 B2 | 10/2003 | Shane | |
| 6,730,214 B2 | 5/2004 | Mazzei | |
| 6,767,008 B2 | 7/2004 | Shane | |
| 6,817,541 B2 | 11/2004 | Sands et al. | |
| 6,840,983 B2 | 1/2005 | McNulty | |
| 6,848,258 B1 | 2/2005 | Speece | |
| 6,855,291 B2 | 2/2005 | Patterson et al. | |
| 6,877,726 B1 | 4/2005 | Rindt et al. | |
| 6,936,179 B2 | 8/2005 | DeWald | |
| 6,962,654 B2 | 11/2005 | Arnaud | |
| 6,964,738 B1 * | 11/2005 | Shen | 210/150 |
| 6,983,929 B2 | 1/2006 | Shane | |
| 7,008,535 B1 | 3/2006 | Spears et al. | |
| 7,255,332 B2 * | 8/2007 | Osborn et al. | 261/28 |
| 7,294,278 B2 * | 11/2007 | Spears et al. | 210/758 |
| 7,566,397 B2 | 7/2009 | Speece | |
| 7,622,036 B2 * | 11/2009 | Morse | 210/86 |
| 7,695,622 B2 * | 4/2010 | Fabiyi et al. | 210/620 |
| 7,833,410 B2 * | 11/2010 | Morse | 210/86 |
| 8,276,888 B2 * | 10/2012 | Osborn et al. | 261/28 |
| 2002/0134736 A1 | 9/2002 | Burris et al. | |
| 2002/0158012 A1 * | 10/2002 | Christodoulatos et al. | 210/617 |
| 2003/0071372 A1 | 4/2003 | Scherzinger et al. | |
| 2003/0183584 A1 | 10/2003 | Galatro et al. | |
| 2003/0209502 A1 | 11/2003 | Lacasse et al. | |
| 2005/0040548 A1 | 2/2005 | Lee et al. | |
| 2008/0017590 A1 | 1/2008 | Suchak et al. | |
| 2009/0101572 A1 * | 4/2009 | Sullivan et al. | 210/601 |

FOREIGN PATENT DOCUMENTS

| | | |
|---|---|---|
| JP | 2001-347146 | 12/2001 |
| JP | 2004 188263 | 8/2005 |
| JP | 2004188263 | 8/2005 |
| WO | 0211870 A2 | 2/2002 |

OTHER PUBLICATIONS

Office Action, U.S. Appl. No. 13/415,402 (issued Aug. 24 2015).
Communication: European Patent Application No. 06 771 268.7, European Patent Office (issued Jul. 15, 2015).
Examiner's Report: Australian Patent Application No. 2006249808, Australian Patent Office (issued May 27, 2010).
Japanese Office Action: Japanese Patent Application No. 2008-513750, Japanese Patent Office (issued Feb. 1, 2011) (Japanese).
Japanese Office Action: Japanese Patent Application No. 2008-513750, Japanese Patent Office (issued Feb. 1, 2011) (English).
Examination Report: New Zealand Patent Application No. 563542, New Zealand Patent Office (issued Dec. 15, 2010).
Mexican Office Action: Mexican Patent Application No. MX/a/2007/014750, Mexican Patent Office (issued Mar. 17, 2011) (Spanish).
Mobley Engineering, Side Stream Super-Saturation, http://www.mobleyengineering.com/technologies/ hydropowerenhancements.html (last visited May 23, 2012).
Japanese Decision of Final Rejection: Japanese Patent Application No. 2008-513750, Japanese Patent Office (issued Feb. 7, 2012) (English).
Japanese Decision of Final Rejection: Japanese Patent Application No. 2008-513750, Japanese Patent Office (issued Feb. 7, 2012) (Japanese).
Examiners Report: Canadian Patent Application No. 2,609,030, Canadian Intellectual Property Office (issued Jan. 15, 2013).
Communication: European Patent Application No. 06 771 268.7, European Patent Office (issued Oct. 8, 2013).
Communication: European Patent Application No. 06 771 268.7, European Patent Office (issued Jan. 22, 2015).
Office Action, U.S. Appl. No. 13/601,124 (issued May 19, 2015).
Office Action, U.S. Appl. No. 13/600,859 (issued Jul. 15, 2013).
Office Action, U.S. Appl. No. 13/600,859 (issued May 19, 2014).
Office Action, U.S. App. No. 13/600,859 (issued Nov. 7, 2013).
Office Action, U.S. Appl. No. 13/415,402 (issued Mar. 24, 2015).
Office Action, U.S. Appl. No. 13/600,950 (issued Feb. 10, 2015).

* cited by examiner

SYSTEMS AND METHODS FOR WASTEWATER TREATMENT

CROSS-REFERENCE TO RELATED APPLICATIONS

This application is a continuation-in-part of, and claims the benefit of, U.S. application Ser. No. 11/921,057, filed Nov. 7, 2008, now U.S. Pat. No. 8,276,888 and issued on Oct. 2, 2012, entitled SYSTEM AND METHOD FOR DISSOLVING GASES IN FLUIDS AND FOR DELIVERY OF DISSOLVED GASES, the disclosure of which is incorporated herein by reference. U.S. application Ser. No. 11/921,057 is the national stage entry of International Patent Application No. PCT/US2006/020391, which claims the benefit of U.S. patent application Ser. No. 11/137,856, now U.S. Pat. No. 7,255,332 and issued on Aug. 14, 2007, the disclosure of which is also incorporated herein by reference. U.S. Pat. No. 7,255,332 claims the benefit of U.S. Provisional Patent Application No. 60/574,152, filed on May 25, 2004. This application also claims the benefit of U.S. Provisional Patent Application No. 61/450,419, filed Mar. 8, 2011, entitled SYSTEMS AND METHODS FOR WASTEWATER TREATMENT, the disclosure of which is incorporated herein by reference.

STATEMENT REGARDING FEDERALLY SPONSORED RESEARCH OR DEVELOPMENT

The present invention has been supported at least in part by the National Science Foundation SBIR Program, Grant No. IIP-0750402DMI-041955 and National Institutes of Health Grant No. NIH 2R42ES014137-02. The Government has certain rights to the invention.

BACKGROUND OF THE INVENTION

1. Field of the Invention

The subject invention is directed to systems and methods for wastewater treatment, and more particularly to systems and methods for using dissolved gas injection to improve membrane bioreactor (MBR) operations. Aspects of the present invention enable the production of high-quality effluent from a wastewater influent at a reasonable cost and over a wide range of influent and pollutant loading rates.

2. Background of the Invention

With the current focus on water reuse projects and the role they play in the water cycle, the search for cost competitive advanced wastewater treatment technologies has never before been so important. Wastewater represents a water resource and its reuse can significantly reduce the demand for water supply.

A membrane bioreactor (MBR) is an effective treatment process for water reuse and reclamation. MBR systems are no longer viewed as a novel process and are used more and more in wastewater treatment applications all over the world. A membrane bioreactor is the combination of a membrane process like microfiltration or ultrafiltration with a suspended growth bioreactor, and is now widely used for municipal and industrial wastewater treatment with plant sizes up to 80,000 population equivalent (i.e. 48 MLD).

Membrane bioreactor systems have two basic configurations: (1) the integrated bioreactor that uses membranes immersed in the bioreactor, shown in FIG. 1(a), and (2) the recirculation MBR, shown in FIG. 1(b), in which the liquor circulates through a membrane module situated outside the bioreactor.

In the integrated MBR system, the key component is the microfiltration membrane that is immersed directly into the activated-sludge reactor. The membranes are mounted in modules (sometimes called cassettes) that can be lowered into the bioreactor. The modules are comprised of the membranes, support structure for the membranes, feed inlet and outlet connections, and an overall support structure. The membranes are typically subjected to a vacuum (less than 50 kPa) that draws the water from within the bioreactor through the membrane filter to separate clean water from solids. To clean the exterior of the membranes, compressed air is introduced through a distribution manifold at the base of the membrane module. As the coarse, relatively large air bubbles rise to the surface, scouring of the membrane surface occurs, removing solids build-up and slowing fouling of the membrane. The air also provides some dissolved oxygen, but the aeration rate from the coarse bubbles is typically not sufficient to maintain aerobic conditions of the liquor within the membrane module or biological treatment module. In current MBRs, other aeration methods, mainly fine (relatively small) bubbles are typically used to provide the remainder of the dissolved oxygen required to maintain aerobic conditions.

When used with domestic wastewater, MBR processes could produce effluent of sufficiently high enough quality to meet regulations for discharge to coastal, surface or brackish waterways or to be reclaimed for irrigation where appropriate.

As noted above, current methods for adding dissolved oxygen to wastewater use air or oxygen gas bubbles injected through aerator heads (perforated ceramic, plastic or rubber) that are placed at the bottom of the column of water in the biological treatment basin. Bubbles rise through the water and dissolve incompletely. Therefore, deeper basins are needed to increase the efficiency of dissolution and depending on the gas, a gas recovery mechanism may be required.

The efficiency of bubbles dissolving into water (called alpha factor) is also greatly affected by the solids concentration in the target water. The greater the solids concentration, the lower the efficiency of oxygen use from aeration bubbles. Once the solids concentration nears 3%, the use of bubbling technology for oxygenation becomes impractical because of the low efficiency of dissolution and associated high power requirements. Because of this oxygenation limitation, the use of MBR's with wastewater with solids concentrations of near 3% or greater has not been commercially feasible.

Moreover, in MBRs, filtration performance inevitably decreases with filtration time. This is due to the deposition of soluble and particulate materials onto and into the membrane, attributed to the interactions between activated sludge components and the membrane. This major drawback and process limitation has been under investigation since the early MBRs were developed, and remains one of the most challenging issues facing further MBR development.

There is a need therefore, for a MBR wastewater treatment system that is more cost effective than current systems, requires a smaller footprint, is capable of operating efficiently over a wide range of influent and pollutant loading rates and is capable of treating wastewater with a solids concentration of near 3% or greater.

BRIEF SUMMARY OF THE INVENTION

The present invention is directed to a system for treating wastewater that includes, inter alia, a bioreactor which defines a basin for receiving wastewater to be treated; a membrane module in fluid communication with the bioreactor; and a dissolution tank. The dissolution tank includes a pressure vessel that defines an internal chamber which contains a portion of the wastewater to be treated or as an alternative, a water source separate from the wastewater being treated and provides a regulated, pressurized gas head space above the wastewater or water into which gas is being dissolved in the dissolution tank. The dissolution tank also includes at least one liquid spray nozzle that permits passage of the wastewater/water into the gas head space of the pressure vessel; and an outlet for discharging the wastewater/waster having a desired gas concentration from the internal chamber of the pressure vessel. The wastewater treatment system of the present invention also includes a gas source in communication with the gas head space of the pressure vessel, and a pumping mechanism (mechanical or non-mechanical) or other water pressurizing mechanism for supplying the wastewater to the spray nozzle of the dissolution tank such that fluid droplets are formed in the gas head space and the gas contained within the pressurized head space is dissolved into the wastewater. The stream of gas saturated water exits the pressurized dissolution tank and is added to the wastewater in communication with the membranes. The proportion of total wastewater entering the biological treatment basin that passes through the invention (dissolution chamber) may be 100% or substantially less as the invention allows the required dissolved oxygen to be delivered to the biological treatment portion of the MBR by either a relatively low dissolved oxygen concentration for 100% of the influent passing through the invention or a higher dissolved oxygen concentration of water passing through the invention when only a portion of the total influent to biological treatment passes through the invention.

In certain embodiments of the present invention, the membrane module is positioned within the basin of the bioreactor. Alternatively, the membrane module can be positioned exterior to the basin of the bioreactor and the wastewater having the desired gas concentration is withdrawn from the basin and is provided to the membrane module using a vacuum pump.

In certain embodiments, the influent is passed through the invention prior to entering the bioreactor and in other embodiments the wastewater in the bioreactor is withdrawn, passed through the invention and re-circulated to the bioreactor. The recirculation flow passing through the invention for oxygenation may or may not be inline with the wastewater recirculation flow also passing through the membrane separation unit, similar to that shown in FIG. 1(b).

It is envisioned that the wastewater treatment system of the present invention could further include a device or mechanism for detecting the level of the fluid in the internal chamber of the pressure vessel and a mechanism/device for adjusting the level of fluid in the pressure vessel in order to achieve the desired dissolved gas concentration within the fluid.

In one embodiment, the present invention is directed to a system for treating wastewater comprising: (a) a bioreactor which defines a basin for receiving wastewater to be treated; (b) a membrane module in fluid communication with the bioreactor; (c) a dissolution tank comprising: (i) a pressure vessel for containing treated wastewater and providing a gas head space comprising at least one gas above the treated wastewater; (ii) at least one liquid spray nozzle that permits passage of untreated wastewater into the gas head space under conditions effective to dissolve the gas in the untreated wastewater; and (iii) an outlet for discharging the treated wastewater from the pressure vessel into the bioreactor or the membrane module; and (d) a gas source in communication with the dissolution tank.

In another embodiment, the present invention is directed to method of treating wastewater comprising: (a) pressurizing a pressure vessel with at least one gas; (b) spraying untreated wastewater into the vessel containing the gas under conditions effective to dissolve the gas in the untreated wastewater; and (c) discharging treated wastewater from the vessel into a bioreactor or a membrane module.

In yet another embodiment, the present invention is directed to method of treating wastewater comprising: (a) pressurizing a pressure vessel with at least one gas; (b) pumping untreated wastewater from a bioreactor to the pressure vessel; (c) spraying the untreated wastewater into the vessel containing the gas under conditions effective to dissolve the gas in the untreated wastewater; and (d) discharging treated wastewater from said vessel into the bioreactor or a membrane module.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the systems and method of the subject invention without undue experimentation, preferred embodiments thereof will be described in detail hereinbelow with reference to certain figures, wherein.

These and other aspects of the subject invention will become more readily apparent to those having ordinary skill in the art from the following detailed description of the invention taken in conjunction with the drawings.

DETAILED DESCRIPTION OF THE INVENTION

Disclosed herein are detailed descriptions of specific embodiments of the systems and methods for wastewater treatment of the present invention. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Figures illustrating the components show some elements that are known and will be recognized by one skilled in the art. The detailed descriptions of such elements are not necessary to an understanding of the invention, and accordingly, are herein presented only to the degree necessary to facilitate an understanding of the novel features of the present invention.

Figure 1A:
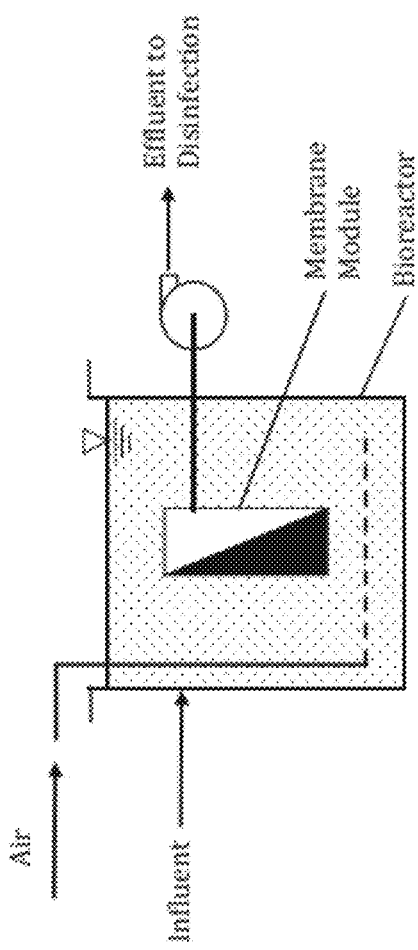
FIG. 1(a) is a schematic view of an integrated bioreactor that uses a membrane immersed in the bioreactor basin.
Figure 1B:
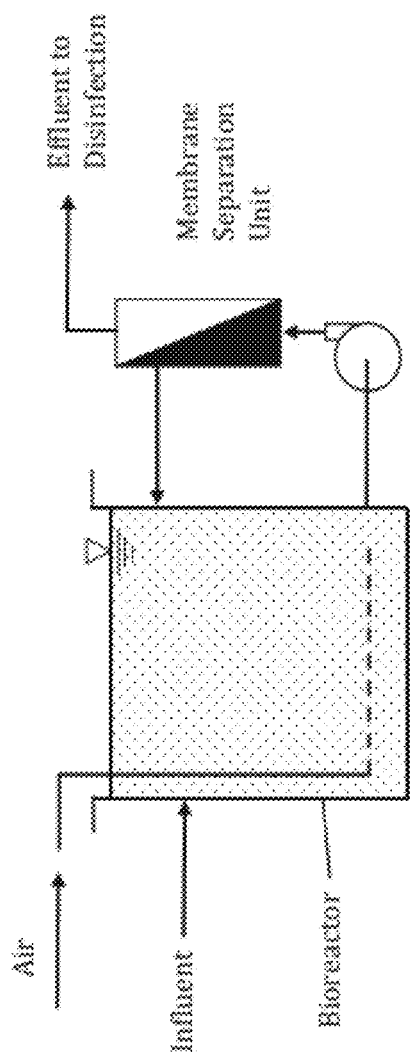
FIG. 1(b) is a schematic view of a recirculated MBR in which the mixed liquor circulates through a membrane module situated outside the bioreactor.
Figure 2:
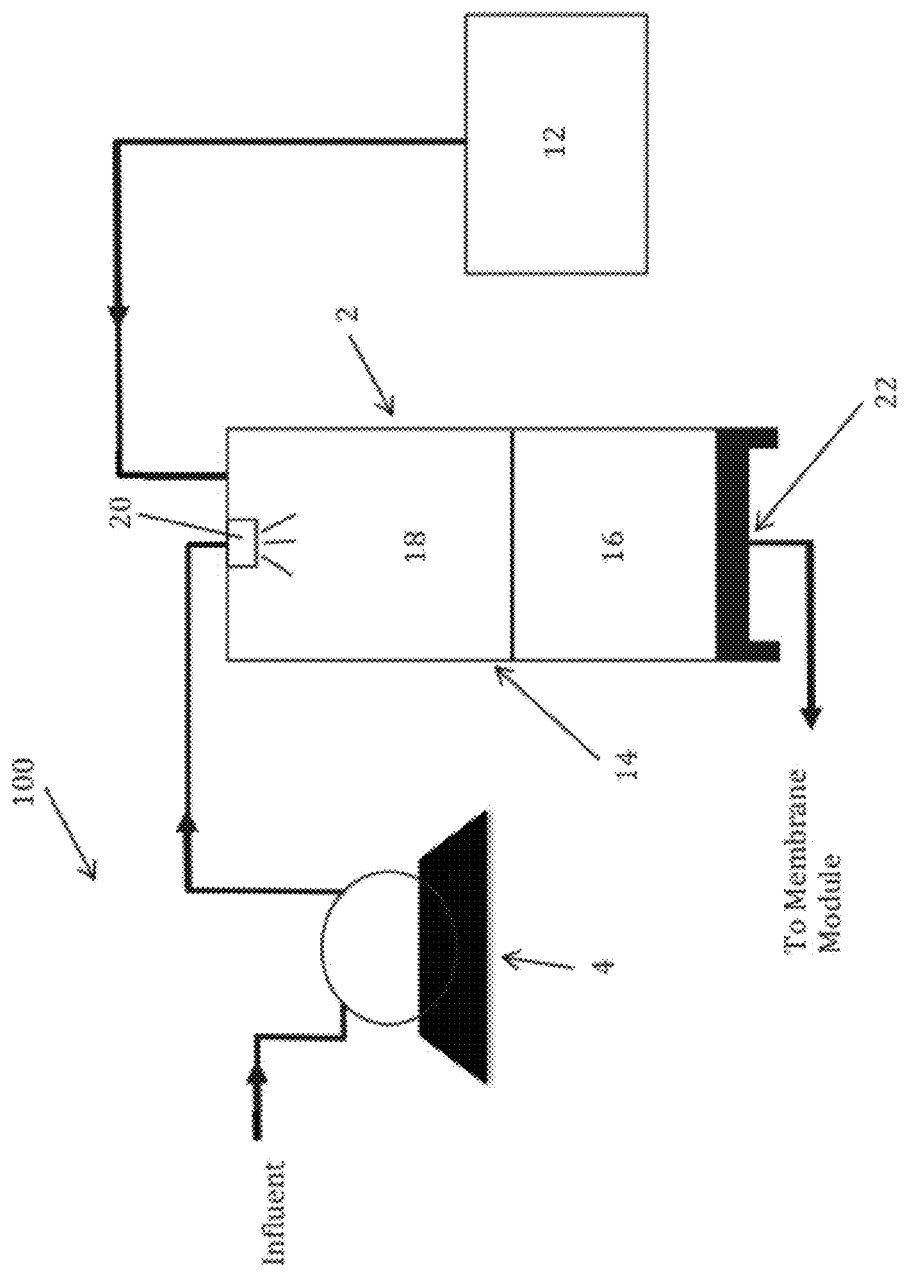
FIG. 2 is a schematic view of an embodiment of the system used for dissolving a gas into wastewater of the present invention.
Figure 3:
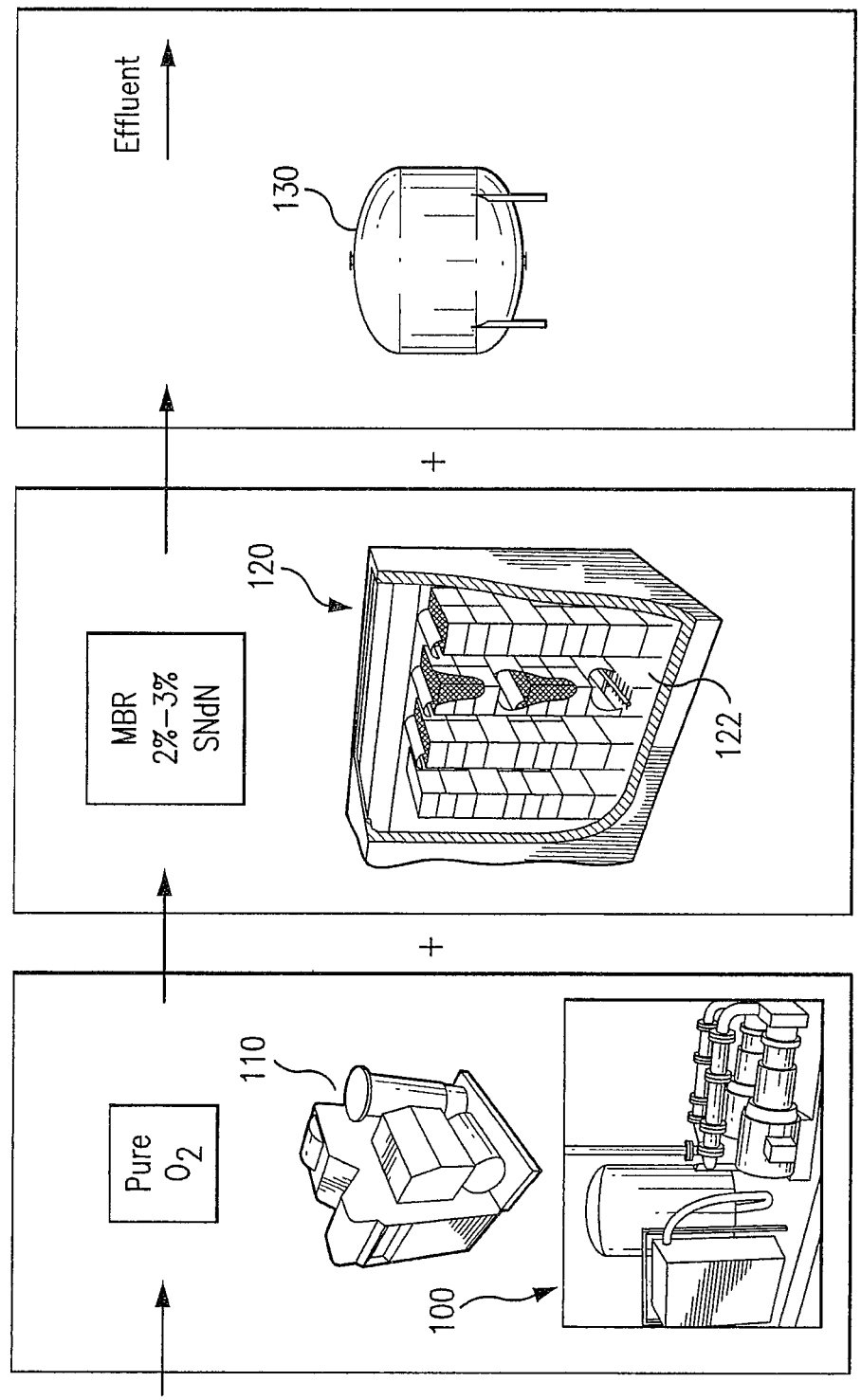
FIG. 3 is a process flow diagram for an embodiment of the wastewater treatment system of the present invention.
Figure 4:
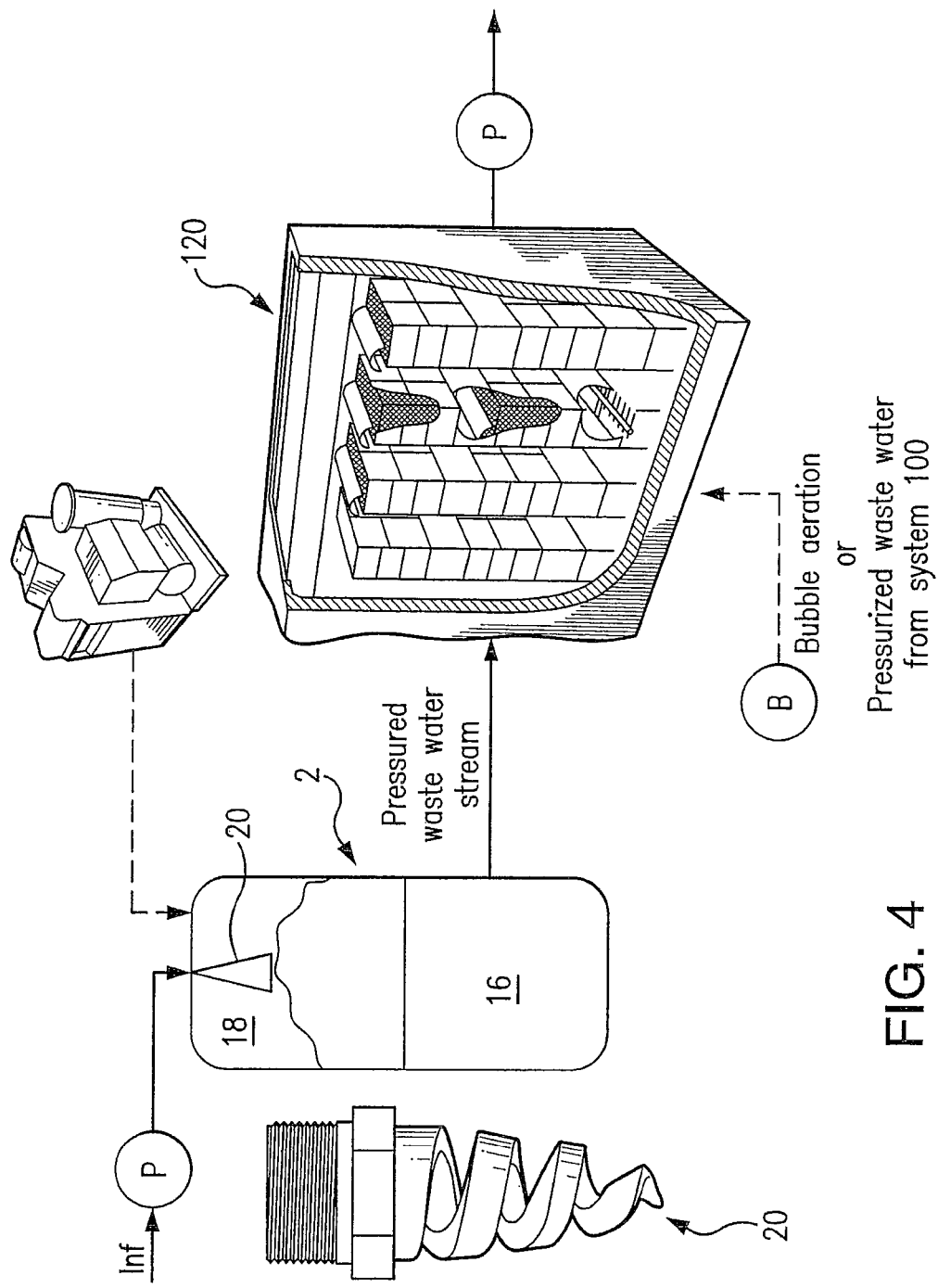
FIG. 4 is a schematic illustrating an embodiment of the spray nozzle, dissolution tank and MBR of the present system.

Referring now to FIGS. 2 through 4, which illustrate portions of a MBR wastewater treatment system of the present invention. The inventive MBR wastewater treatment system includes a system or device for dissolving gases in a fluid which has been designated as reference number 100. System 100 is similar to the system disclosed in U.S. application Ser. No. 11/921,057, now U.S. Pat. No. 8,276,888, but includes additional mechanisms, sensors and controls which specially adapt it for use in wastewater applications and also allow the liquid level within the dissolution tank to be adjusted, so as to be able to regulate the gas transfer efficiency of the system while maintaining, if desired, a constant flow rate of the fluid/wastewater. This feature is particularly advantageous in wastewater applications as it allows for nitrification and de-nitrification to occur in a single basin within the bioreactor.

Gas dissolution system 100 includes, inter alia, a dissolution tank 2 and fluid pumping mechanism 4 in fluid communication with the dissolution tank 2. The pumping mechanism 4 receives wastewater to be treated from, for example, within the basin 122 of the bioreactor 120. The pumping mechanism can be for example, a conventional mechanical pump or it can be a non-mechanical device.

A source 12 of gas is in communication with the dissolution tank 2. Dissolution tank 2 preferably includes a pressure vessel 14 that defines an internal chamber which contains wastewater 16 and provides a gas head space 18 above the wastewater at preferably a super-atmospheric pressure. The dissolution tank 2 also includes at least one liquid spray nozzle 20 (see also FIG. 4) that permits passage of the wastewater into the pressure vessel 14 through action of pumping mechanism 4. The dissolution tank 2 also includes an outlet 22 through which gasified wastewater (i.e., wastewater having the desired gas concentration) is discharged from the tank and supplied to, for example, the bioreactor basin or the membrane module. In the example shown in FIG. 3, the gasified wastewater is discharged into bioreactor 120. Due to the difference in pressure between the pressurized wastewater being discharged from system 100 and the wastewater within the bioreactor 120, the dissolved gas concentration of the fluid released from the tank will be at near saturation conditions relative to the pressure in the tank, but will be at supersaturated condition relative to the lower pressure wastewater being treated the bioreactor.

The water exiting the present invention contains a much greater concentration of dissolved gas than is possible for the wastewater in the bioreactor because of the supersaturated state. Thereby, only a small portion of the supersaturated water must be added to the larger body of water in the bioreactor to meet the dissolved oxygen requirements for the bioreactor, which are typically at dissolved oxygen concentrations less than saturated. The supersaturated water stream from the present invention is released into the basin such that mixed liquor distribution occurs in the liquid state and no dissolved gas exits solution in the form of bubbles from the wastewater. The gas is preferably, but not limited to, air, oxygen, ozone, hydrogen, nitrogen, nitrous oxide, or carbon dioxide, and the liquid is typically composed primarily of water.

FIG. 3 provides a process flow for an embodiment of the wastewater treatment system of the present invention. As shown in this figure, pure oxygen is generated by an oxygen generator 110 for use with system 100. The wastewater is passed through system 100 where it is loaded with a desired dissolved oxygen concentration. The amount of dissolved oxygen is controlled and adjusted by system 100, so as to be able to periodically alternate the oxygen concentration of the bioreactor water between aerobic and anaerobic conditions and support nitrification and de-nitrification within a single basin within the bioreactor 120.

A U.S. Provisional Patent Application entitled SYSTEMS AND METHODS FOR DELIVERING A LIQUID HAVING A DESIRED DISSOLVED GAS CONCENTRATION, which is incorporated by reference in its entirety, discloses a method for controlling the dissolved gas delivery rate of system 100 using liquid level control within the dissolution tank. The disclosed level control method includes controlling the level of the liquid 16 in the dissolution tank in order to change the volume of the gaseous headspace 18 in the dissolution tank 2. The fluid level within the tank is detected by, for example, a liquid level gauge. Preferably, the liquid level reading is transmitted to controls or a control system which can be comprised of a programmable logic controller or other logic and/or relay programming. The control system can be used to automatically adjust the liquid level within the tank based on the sensed liquid level and the desired dissolution rate for the gas. Those skilled in the art will readily appreciate that other means for sensing the level of the liquid within the tank can be used without departing from the scope of the present invention. Moreover, the liquid level can be adjusted manually and without the aid of a control system.

The use of the system 100 with a MBR allows greater amounts of dissolved oxygen to be effectively added to wastewater with much higher concentrations of solids than if traditional oxygen delivery technology (coarse bubbles) is used because the oxygen added is in dissolved form and mixed with the bioreactor water and does not rely on gas exchange between bubbles and wastewater and is not subject to limitation to gas exchange efficiency (alpha factor) caused by a high solids concentration. If higher concentrations of solids can be effectively oxygenated to support biological treatment of wastewater, then the capacity of a specific sized MBR can increase, thereby reducing the effective footprint and installed capital cost of an MBR for a specific wastewater treatment capacity. System 100 therefore allows for a different design of MBR's to use a high concentration of solids. System 100 is used to supersaturate the incoming raw wastewater (screened) such that the oxygen added to the feed water and the small amount added by coarse bubble scouring used for cleaning membranes meets all of the oxygen needs of the bioprocesses. System 100 could also oxygenate the mixed liquor or a portion of the MBR permeate recycled back to the MBR. Since system 100 adds oxygen without bubbles, the basin into which the oxygen is added does not need depth to allow bubbles to dissolve while rising through the water column as with competing oxygenation technology. This allows for a shallower basin design that lends itself to smaller package installations that can be manufactured modularly and shipped on a truck instead of built in place. This further reduces installed costs.

In the embodiment disclosed herein, the outlet carrier stream for system 100 is injected into the holding tank that is used to feed the biological treatment portion to convert biological processes to aerobic and reduce the required oxygen loading that must be added in the biological treatment cell. MBR technology is typically constructed on-site and is limited in water depth that can be provided thereby limiting oxygen delivery efficiency and corresponding high costs.

As noted previously, current methods for adding dissolved oxygen use air or oxygen gas bubbles injected through aerator heads (perforated ceramic, plastic or rubber) that are placed at the bottom of the column of water in the biological treatment basin. Bubbles rise through the water and dissolve incompletely. Deeper basins result in increased efficiency of dissolution. The efficiency of bubbles dissolving into water (called alpha factor) is also greatly affected by solids concentration in the target water. The greater the solids concentration is, the lower the efficiency of dissolving oxygen gas from aeration bubbles into the water. Once solids concentration reaches 3%, the use of bubbling technology for oxygenation becomes impractical because of the low efficiency of dissolution and associated high power requirements. Because of this oxygenation limitation, the use of MBR's with wastewater with solids concentrations of 3% or greater has been impracticable. Use of system 100 does not result in a significant loss of oxygen delivery efficiency to the target water since the dissolved oxygen is added in a predissolved form via a water stream. Therefore, MBR solids concentrations can reach 3% and be effectively oxygenated using the system 100. Increasing the concentration of solids in wastewater that can be treated reduces the footprint and energy consumption of the MBR, which are the major drivers in the MBR market.

The wastewater containing high dissolved oxygen concentrations produced by system 100 can be injected into very shallow water with high gas transfer efficiency and not only reduce input costs and energy, but increase the amount and rate of dissolved oxygen added. Use of system 100 will allow MBRs to be constructed with more shallow water and lead to process design improvements such as different orientation of process chambers and membranes. The system 100 injection could also allow higher dissolved oxygen concentrations to be maintained in the cells since current bubbling technology limits the practical dissolved oxygen (DO) concentration to below 4 mg/L. System 100 could allow operation of the biological treatment portion of the MBR to operate at high DO up to saturation conditions such that bacteria that consume organic matter can perform more rapidly due to the removal of oxygen limited respiration and allowing the bacterial processing to evolve to species that outcompete at the higher DO level or the use of genetically modified or otherwise manipulated bacterial populations to be supported that can consume waste more quickly and efficiently at higher DO levels.

System 100 can also be used to provide DO to the effluent stream from the MBR for release into the environment. More specifically, the effluent from the MBR can be circulated through system 100 in order to add further dissolved gas to the fluid or MBR effluent can be treated by adding a separate stream of water that contains high dissolved gas concentration that will mix with the effluent stream to create water with a desired dissolved gas concentration.

Moreover, the addition of dissolved ozone can allow MBR's to remove emerging contaminants, such as drug residuals and endocrine disruptors, without adding additional disinfection technology while simultaneously adding oxygen (a byproduct of ozone oxidation reaction with contaminants) and breaking down solids via oxidation reactions allowing more efficient and rapid digestion of solids via biological treatment.

System 100 also allows precise control of dissolved oxygen feed rate so that the oxygen consuming processes involved in biological treatment can be closely controlled by operating system 100 using a DO probe to maintain a constant desired DO in the treatment process in response to changing flow rates, demands, and other process parameters that increase or decrease water DO. The DO can also be precisely controlled to cycle between anaerobic and aerobic conditions to allow nitrification and denitrification processes used to remove nutrients more effectively from wastewater to occur in the same basin without requiring two basins. This precise control can allow improvements in process efficiency as optimal DO conditions can be maintained continuously allowing maximum treatment rate for those processes that are rate controlled by oxygen availability. System 100's injection of DO at precisely controlled rates will also prevent overuse of oxygen and save operating costs.

Figure 5:
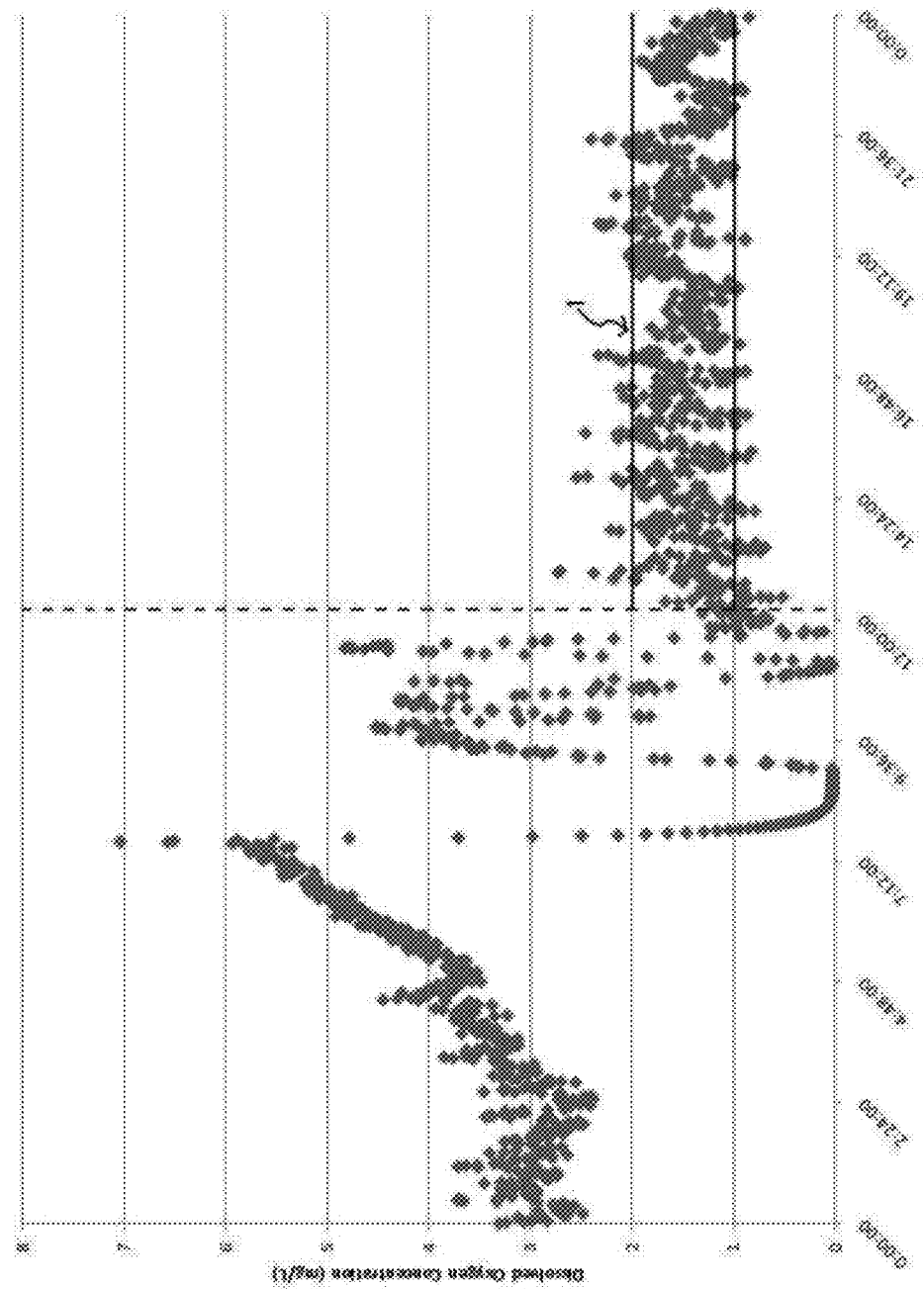
FIG. 5 is a graphical representation showing the concentration of dissolved oxygen in a membrane bioreactor basin over time with and without use of a level control method.
Figure 6:
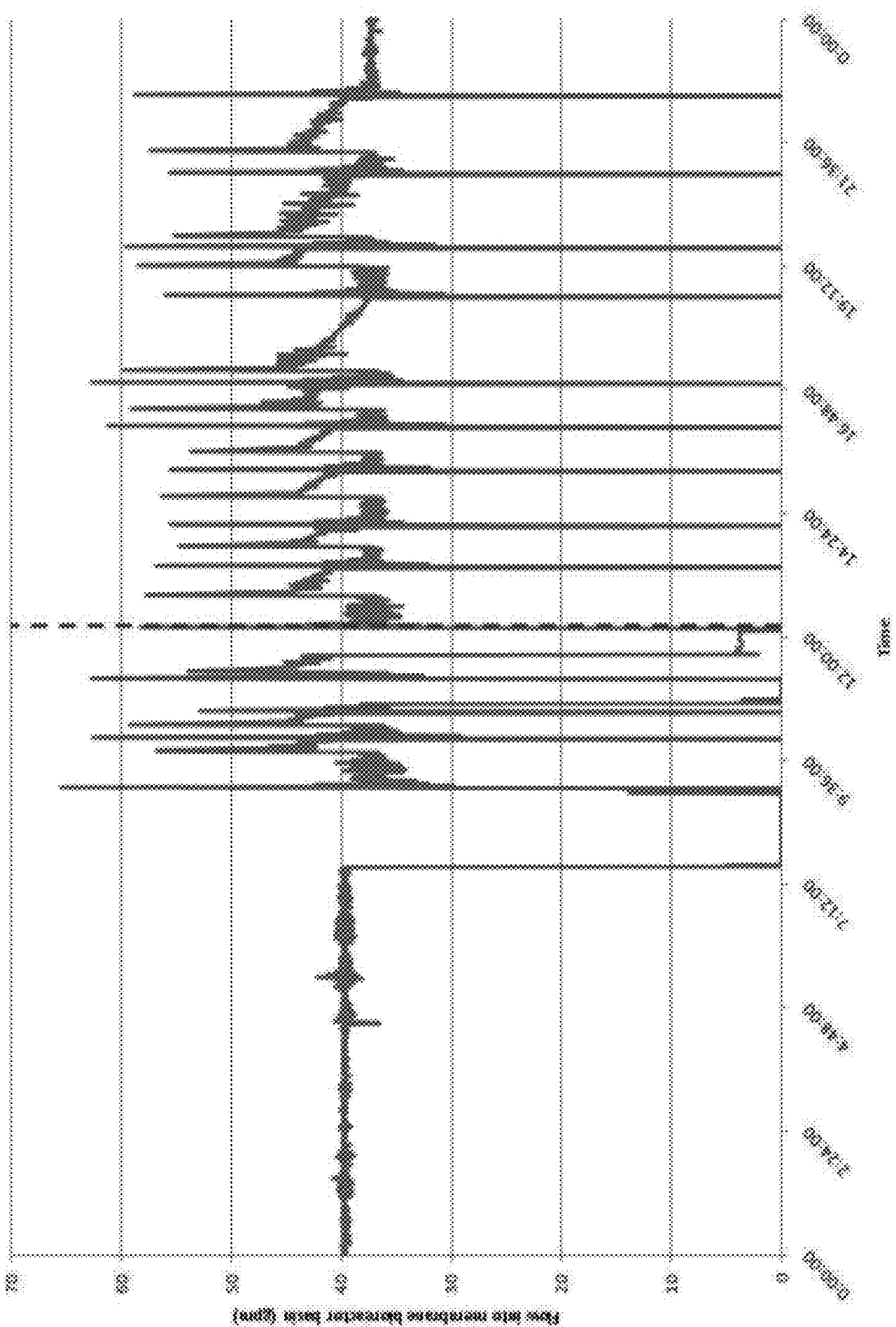
FIG. 6 is a graphical representation showing the varying flow rate for the fluid entering into the membrane bioreactor basin of FIG. 5.

FIG. 5 provides a graphical representation to illustrate the precision control of dissolved oxygen delivery to a membrane bioreactor basin using the present invention. In the first part of FIG. 5, the fluid level within the dissolution tank is not varying, but the flow through the system is varying, and therefore, the oxygen delivery rate is in flux. Basically, the efficiency of the system is changing dramatically as the flow changes. The area identified by reference numeral 110 illustrates the control of the dissolved oxygen concentration over time in the membrane bioreactor basin as it operates to alternate between aerobic and anaerobic conditions (1 and 2 mg/L). FIG. 6 illustrates the varying flow into the present invention, as well as, the bioreactor basin during the same time period as in FIG. 5. The data is from an MBR operated by passing 100% of the bioreactor influent through the present invention prior to entry into the bioreactor. The sudden increase and decrease in flow indicated by the vertical lines shows how the present invention controlled the delivery rate of dissolved oxygen to the biological treatment basin of the MBR and thereby controlled the DO for nitrification and denitrification in a single basin. To reduce DO in the basin to produce anaerobic conditions, the liquid level in the dissolution tank was increased by suddenly increasing the flow rate into the tank via the pump by increasing the rotation speed of the pump electronically. As the liquid level increased in the tank, the gas headspace volume reduced such that their was no longer sufficient contact area between water spray and gas to allow saturation of the spray particles with gas thereby greatly reducing the rate of dissolved oxygen added to the biological treatment basin. When the liquid level is being increased, excess gas within the tank is vented off in order to prevent excessive pressure build-up within the tank.

The rapid oxygen uptake rate by the bacteria in the biological treatment basin coupled with no dissolved oxygen addition quickly lowered the DO to anaerobic conditions. When aerobic conditions were required, the water flow rate into the dissolution vessel was greatly reduced such that the liquid level in the tank dropped suddenly increasing the gas headspace to a volume sufficient to supersaturate the liquid spray thereby suddenly increasing the rate of dissolved oxygen added to the biological treatment basin to overcome the oxygen uptake rate of the bacteria to restore aerobic conditions.

Another use of bubbling technology for MBRs is to use the coarse bubbles to physically remove buildup of solids on the outer surface of the membranes. An orifice tube apparatus could be provided with system 100 and could be placed into the cell containing the membranes with the ejected fluid being directed at the proper location to continually clean membrane surfaces while dissolved oxygen is being added to the water. The direction of a fluid stream will contain more force and would be more energy efficient than gas bubbles. A large portion of the energy used to pressurize the fluid stream in system 100 could be recovered through fluid stream use for cleaning the membrane surfaces (as a replacement for bubble injection energy) as well as providing mixing for distribution and suspension of solids in the wastewater being treated. Better cleaning of membranes will reduce maintenance costs and extend the life of membranes. Energy provided by system 100's injection of fluid streams can also be directed to better distribute sludge and improve overall MBR operational efficiency.

Another use of the system 100 is to prevent the formation of bubbles that can cause foam and other disruption of the processes that clean the wastewater and prevent the problem of dissolved air floatation that can undesirably separate solids from the liquid being filtered.

Another use of system 100 in the MBR process is for injection of dissolved ozone. System 100 can inject dissolved ozone into wastewater without the formation of bubbles. This allows for more efficient use of the oxygen gas feeding ozone generators and also improves the efficiency of the use of ozone thereby requiring less power consumption and capital equipment to provide the same delivery rate of ozone as current equipment.

The raw feed water to the MBR could pass through the system 100 to allow for oxidation of target contaminants as well as oxidation of organics to allow more effective biological treatment. The ozonation byproduct of oxygen will be beneficial to the process to allow for less costly operation. Precise control of dissolved ozone delivery also allows process efficiency as previously described for dissolved oxygen and allows for shallow treatment cells. The benefit of dissolved ozone delivery in MBRs is for pretreatment of solids to allow better filtering by the membranes and digestion of solids in the bioprocess. Post filter treatment with dissolved ozone will disinfect wastewater (removal of bacteria, cysts, protozoa, algae, viruses) prior to release as well as oxidize many chemical pollutants such as drug residuals, endocrine disruptors, pesticides, industrial and consumer chemicals and other chemicals of emerging concern. Ozone treatment of the MBR wastewater could be done either before or after the membrane filtration process to realize oxidation of contaminants. Use of the system 100 will also minimize off-gassing of ozone and reduce costs for capture and destruction of excess ozone gas. The injection of gasified wastewater using system 100 at membranes could reduce cleaning and maintenance costs and extend membrane lifespan before replacement is required. Treatment of wastewater entering the MBR using system 100 supplied with ozone will destroy plasmids and reduce the incidence of conveyance of antibiotic resistance among bacteria in the biological treatment stages in the MBR. System 100 can also be used to oxidize sludge formed in the MBR process and reduce the mass/volume of sludge that must be removed.

The use of system 100 in the MBR system could reduce the use of chemicals in the current operation used for flocculation, membrane filtration efficiency, membrane lifespan improvement, disinfection, solids and treatment to reduce the rate of sludge production.

The injection of ozone using system 100 can be coupled with hydrogen peroxide addition to improve all above treatment processes especially solids reduction.

Moreover, system 100 can be applied to pre-treatment to reduce bacterial populations in raw water to allow inoculation with bacteria more advantageous to biological treatment, membrane filtration, and enhanced phosphorous and contaminant removal.

While the subject invention has been described with respect to preferred embodiments, those skilled in the art will readily appreciate that changes and modifications may be made thereto without departing from the spirit and scope of the subject invention as defined by the appended claims.

What is claimed is:

1. A system for treating wastewater comprising:
   (a) a bioreactor which defines a basin configured to receive untreated wastewater to be treated;
   (b) a membrane module in fluid communication with the bioreactor;
   (c) a dissolution tank comprising:
      (i) a pressure vessel configured to contain treated wastewater and to provide a gas head space comprising at least one gas above the treated wastewater;
      (ii) at least one liquid spray nozzle configured to pass the untreated wastewater from the bioreactor into the gas head space under conditions effective to dissolve the gas in the untreated wastewater; and
      (iii) an outlet configured to discharge the treated wastewater from the pressure vessel into the bioreactor or the membrane module; and
   (d) a gas source in communication with the dissolution tank.

2. The system for treating wastewater as recited in claim 1, wherein the membrane module is positioned within the basin of the bioreactor.

3. The system for treating wastewater as recited in claim 1, wherein the membrane module is positioned exterior to the basin of the bioreactor, and the treated wastewater is withdrawn from the basin and is provided to the membrane module using a vacuum pump.

4. The system for treating wastewater as recited in claim 1, further comprising a level sensor for detecting the level of the treated wastewater in the pressure vessel and a control system for adjusting the level of the treated wastewater in the pressure vessel in order to achieve the desired dissolved gas concentration within the treated wastewater in the bioreactor.

5. A system for treating wastewater as recited in claim 1, further comprising a pump for supplying the untreated wastewater to the spray nozzle of the dissolution tank.

6. The system for treating wastewater as recited in claim 5, wherein said pump is a mechanical device.

7. The system for treating wastewater as recited in claim 1, wherein the at least one gas of the gas head space is selected from the group consisting of air, oxygen, ozone, hydrogen, nitrogen, nitrous oxide, and carbon dioxide.

8. The system for treating wastewater as recited in claim 1, wherein said gas source is an oxygen generator.

9. A method of treating wastewater comprising:
   (a) pressurizing a pressure vessel with at least one gas;
   (b) pumping untreated wastewater from a bioreactor to the pressure vessel;
   (c) spraying the untreated wastewater into the vessel containing the gas under conditions effective to dissolve the gas in the untreated wastewater to produce treated wastewater; and
   (d) discharging the treated wastewater from said vessel into the bioreactor or a membrane module.

10. The method of treating wastewater as recited in claim 9, wherein the bioreactor comprises a basin for receiving treated and untreated wastewater.

11. The method of treating wastewater as recited in claim 10, wherein the membrane module is positioned within the basin of the bioreactor.

12. The method of treating wastewater as recited in claim 10, wherein the membrane module is positioned exterior to the basin of the bioreactor.

13. The method for treating wastewater as recited in claim 9, wherein the at least one gas is selected from the group consisting of air, oxygen, ozone, hydrogen, nitrogen, nitrous oxide, and carbon dioxide.

14. The system for treating wastewater as recited in claim 1, wherein said dissolution tank is configured to produce anaerobic conditions in the bioreactor.

15. The system for treating wastewater as recited in claim 1, wherein said dissolution tank is configured to produce aerobic conditions in the bioreactor.

16. The system for treating wastewater as recited in claim 1, further comprising an orifice tube configured to eject treated wastewater on the membrane module.

17. The method of treating wastewater as recited in claim 9, further comprising the step of controlling a dissolved oxygen concentration in the bioreactor for nitrification and denitrification in the bioreactor.

18. The method of treating wastewater as recited in claim 9, further comprising the step of ejecting treated wastewater from an orifice tube to clean said membrane module.

* * * * *